（12) United States Patent
Haskara et al.

(10) Patent No.: US 9,932,918 B2
(45) Date of Patent: Apr. 3, 2018

(54) METHOD OF FEEDFORWARD TURBOCHARGER CONTROL FOR BOOSTED ENGINES WITH MULTI-ROUTE EGR

(71) Applicant: GM GLOBAL TECHNOLOGY OPERATIONS LLC, Detroit, MI (US)

(72) Inventors: Ibrahim Haskara, Macomb, MI (US); Yue-Yun Wang, Troy, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 770 days.

(21) Appl. No.: 14/550,673

(22) Filed: Nov. 21, 2014

(65) Prior Publication Data

US 2016/0146130 A1 May 26, 2016

(51) Int. Cl.
*F02D 41/00* (2006.01)
*F02B 37/12* (2006.01)
(Continued)

(52) U.S. Cl.
CPC ............ *F02D 41/005* (2013.01); *F02B 37/12* (2013.01); *F02D 23/00* (2013.01);
(Continued)

(58) Field of Classification Search
CPC ............... F02D 41/005; F02D 41/0007; F02D 41/0062; F02D 41/0072; F02D 23/00;
(Continued)

(56) References Cited

U.S. PATENT DOCUMENTS 5,727,528 A * 3/1998 Hori ..................... F02D 41/0072
123/486
6,293,267 B1 * 9/2001 Smith ................. F02D 35/0007
123/568.22
(Continued)

FOREIGN PATENT DOCUMENTS

CN 103470407 A 12/2013

*Primary Examiner* — Hieu T Vo
*Assistant Examiner* — Arnold Castro

(57) ABSTRACT

An engine includes an exhaust gas recirculation system with a high pressure exhaust gas recirculation loop and a low pressure exhaust gas recirculation loop, and an air charging system. A method of controlling the air charging system includes monitoring an actual exhaust gas recirculation rate, operating conditions of a compressor and turbine in the air charging system. A compressor flow is determined based on a target exhaust gas recirculation rate, a target intake manifold pressure and the actual exhaust gas recirculation rate. A power requested by the compressor is determined based on the compressor flow, the target intake manifold pressure, and the monitored operating conditions of the compressor. A power to be generated by the turbine is determined based upon the power requested by the compressor. A turbine flow is determined based upon the power to be generated by the turbine and the monitored operating conditions of the turbine. A system control command is determined based on the turbine flow and the monitored operating conditions of the turbine. The air charging system is controlled based on the system control command.

9 Claims, 7 Drawing Sheets

(51) Int. Cl.
*F02D 23/00* (2006.01)
*F02M 25/07* (2006.01)
*F02M 26/05* (2016.01)
*F02M 26/06* (2016.01)
*F02M 26/24* (2016.01)
*F02M 26/48* (2016.01)

(52) U.S. Cl.
CPC ..... *F02D 41/0007* (2013.01); *F02D 41/0062* (2013.01); *F02D 41/0072* (2013.01); *F02M 26/05* (2016.02); *F02M 26/06* (2016.02); *F02M 26/24* (2016.02); *F02M 26/48* (2016.02); *Y02T 10/144* (2013.01); *Y02T 10/47* (2013.01)

(58) Field of Classification Search
CPC ........ F02M 26/05; F02M 26/06; F02M 26/24; F02M 26/48; F02B 37/12; Y02T 10/47; Y02T 10/144
See application file for complete search history.

(56) References Cited

U.S. PATENT DOCUMENTS

| | | | |
|---|---|---|---|
| 2004/0061290 A1* | 4/2004 | Gray, Jr. | F01N 3/035 277/411 |
| 2009/0293851 A1* | 12/2009 | Bleile | F02D 41/0007 123/568.26 |
| 2010/0211294 A1* | 8/2010 | Soejima | F02D 11/105 701/108 |
| 2011/0264353 A1* | 10/2011 | Atkinson | F02D 41/1402 701/102 |
| 2012/0173118 A1 | 7/2012 | Wang | |
| 2014/0174073 A1* | 6/2014 | Karnik | F02B 37/18 60/602 |
| 2016/0146130 A1* | 5/2016 | Haskara | F02D 41/005 701/108 |
| 2016/0177852 A1* | 6/2016 | Wang | F02D 41/1401 701/108 |

* cited by examiner

METHOD OF FEEDFORWARD TURBOCHARGER CONTROL FOR BOOSTED ENGINES WITH MULTI-ROUTE EGR

TECHNICAL FIELD

This disclosure is related to control of internal combustion engines

BACKGROUND

The statements in this section merely provide background information related to the present disclosure. Accordingly, such statements are not intended to constitute an admission of prior art.

Engine control includes control of parameters in the operation of an engine based upon a desired engine output, including an engine speed and an engine load, and resulting operation, for example, including engine emissions. Parameters controlled by engine control methods include air flow, fuel flow, and intake and exhaust valve settings.

Boost air can be provided to an engine to provide an increased flow of air to the engine relative to a naturally aspirated intake system to increase the output of the engine. A turbocharger utilizes pressure in an exhaust system of the engine to drive a compressor providing boost air to the engine. Exemplary turbochargers can include variable geometry turbochargers (VGT), enabling modulation of boost air provided for given conditions in the exhaust system. A supercharger utilizes mechanical power from the engine, for example, as provided by an accessory belt, to drive a compressor providing boost air to the engine. Engine control methods control boost air in order to control the resulting combustion within the engine and the resulting output of the engine.

Exhaust gas recirculation (EGR) is another parameter that can be controlled by engine controls. An exhaust gas flow within the exhaust system of an engine is depleted of oxygen and is essentially an inert gas. When introduced to or retained within a combustion chamber in combination with a combustion charge of fuel and air, the exhaust gas moderates the combustion, reducing an output and an adiabatic flame temperature. EGR can also be controlled in combination with other parameters in advanced combustion strategies, for example, including homogeneous charge compression ignition (HCCI) combustion. EGR can also be controlled to change properties of the resulting exhaust gas flow. Engine control methods control EGR in order to control the resulting combustion within the engine and the resulting output of the engine. EGR system circuits can include multiple routes of providing exhaust gas into the combustion chamber including high pressure (HP) exhaust gas recirculation circuits and low pressure (LP) exhaust gas recirculation circuits. In boosted engines, exhaust gas may be directed into the engine intake manifold via a high pressure route wherein the exhaust gas is directed back into the intake flow prior to flowing through the VGT such that the exhaust gas remains pressurized. The exhaust gas may additionally be directed back to the engine intake manifold through a circuit after passing through the VGT, at which point the exhaust gas is no longer under pressure.

Air handling systems for an engine manage the flow of intake air and EGR into the engine. Air handling systems must be equipped to meet charge air composition targets (e.g. an EGR fraction target) to achieve emissions targets, and meet total air available targets (e.g. the charge flow mass flow) to achieve desired power and torque targets. The actuators that most strongly affect EGR flow generally affect charge flow, and the actuators that most strongly affect charge flow generally affect EGR flow. Therefore, an engine with a modern air handling system presents a multiple input multiple output (MIMO) system with coupled input-output response loops.

MIMO systems, where the inputs are coupled, i.e. the input-output response loops affect each other, present well known challenges in the art. An engine air handling system presents further challenges. The engine operates over a wide range of parameters including variable engine speeds, variable torque outputs, and variable fueling and timing schedules. In many cases, exact transfer functions for the system are unavailable and/or the computing power needed for a standard decoupling calculation is not available. Multi-route EGR operation allows the system to run higher EGR rates at higher boost levels, but affects the VGT/compressor flow and power which impacts boost control design and performance.

SUMMARY

An engine includes an exhaust gas recirculation system with a high pressure exhaust gas recirculation loop and a low pressure exhaust gas recirculation loop, and an air charging system. A method of controlling the air charging system includes monitoring an actual exhaust gas recirculation rate, operating conditions of a compressor in the air charging system and operating conditions of a turbine in the air charging system. A compressor flow is determined based on a target exhaust gas recirculation rate, a target intake manifold pressure and the actual exhaust gas recirculation rate. A power requested by the compressor in the air charging system is determined based on the compressor flow, the target intake manifold pressure, and the monitored operating conditions of the compressor. A power to be generated by the turbine is determined based upon the power requested by the compressor. A turbine flow is determined based upon the power to be generated by the turbine and the monitored operating conditions of the turbine. A system control command for the air charging system is determined based on the turbine flow and the monitored operating conditions of the turbine. The air charging system is controlled based on the system control command.

BRIEF DESCRIPTION OF THE DRAWINGS

One or more embodiments will now be described, by way of example, with reference to the accompanying drawings, in which.

DETAILED DESCRIPTION

Figure 1:
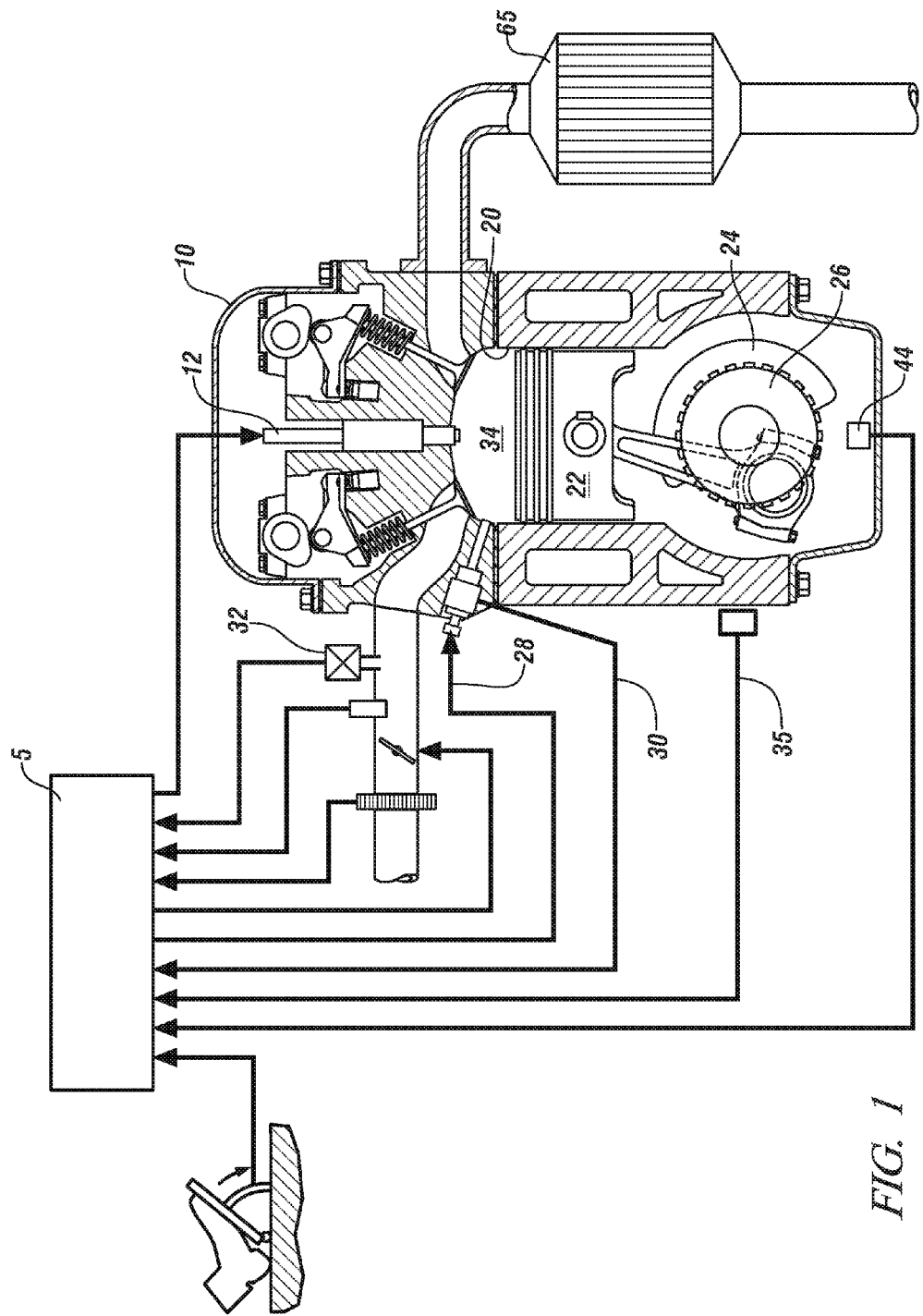
FIG. 1 schematically depicts an exemplary internal combustion engine, control module, and exhaust aftertreatment system, in accordance with the present disclosure.

Referring now to the drawings, wherein the showings are for the purpose of illustrating certain exemplary embodiments only and not for the purpose of limiting the same, FIG. 1 schematically depicts an exemplary internal combustion engine 10, control module 5, and exhaust aftertreatment system 65, in accordance with the present disclosure. The exemplary engine includes a multi-cylinder, direct-injection, compression-ignition internal combustion engine having reciprocating pistons 22 attached to a crankshaft 24 and movable in cylinders 20 which define variable volume combustion chambers 34. The crankshaft 24 is operably attached to a vehicle transmission and driveline to deliver tractive torque thereto, in response to an operator torque request, $T_{O\_REQ}$. The engine preferably employs a four-stroke operation wherein each engine combustion cycle includes 720 degrees of angular rotation of crankshaft 24 divided into four 180-degree stages (intake-compression-expansion-exhaust), which are descriptive of reciprocating movement of the piston 22 in the engine cylinder 20. A multi-tooth target wheel 26 is attached to the crankshaft and rotates therewith. The engine includes sensors to monitor engine operation, and actuators which control engine operation. The sensors and actuators are signally or operatively connected to control module 5.

The engine is preferably a direct-injection, four-stroke, internal combustion engine including a variable volume combustion chamber defined by the piston reciprocating within the cylinder between top-dead-center and bottom-dead-center points and a cylinder head including an intake valve and an exhaust valve. The piston reciprocates in repetitive cycles each cycle including intake, compression, expansion, and exhaust strokes.

The engine preferably has an air/fuel operating regime that is primarily lean of stoichiometry. One having ordinary skill in the art understands that aspects of the disclosure are applicable to other engine configurations that operate either at stoichiometry or primarily lean of stoichiometry, e.g., lean-burn spark-ignition engines or the conventional gasoline engines. During normal operation of the compression-ignition engine, a combustion event occurs during each engine cycle when a fuel charge is injected into the combustion chamber to form, with the intake air, the cylinder charge. The charge is subsequently combusted by action of compression thereof during the compression stroke.

The engine is adapted to operate over a broad range of temperatures, cylinder charge (air, fuel, and EGR) and injection events. The methods disclosed herein are particularly suited to operation with direct-injection compression-ignition engines operating lean of stoichiometry to determine parameters which correlate to heat release in each of the combustion chambers during ongoing operation. The methods are further applicable to other engine configurations, including spark-ignition engines, including those adapted to use homogeneous charge compression ignition (HCCI) strategies. The methods are applicable to systems utilizing multi-pulse fuel injection events per cylinder per engine cycle, e.g., a system employing a pilot injection for fuel reforming, a main injection event for engine power, and where applicable, a post-combustion fuel injection event for aftertreatment management, each which affects cylinder pressure.

Sensors are installed on or near the engine to monitor physical characteristics and generate signals which are correlatable to engine and ambient parameters. The sensors include a crankshaft rotation sensor, including a crank sensor 44 for monitoring crankshaft (i.e. engine) speed (RPM) through sensing edges on the teeth of the multi-tooth target wheel 26. The crank sensor is known, and may include, e.g., a Hall-effect sensor, an inductive sensor, or a magnetoresistive sensor. Signal output from the crank sensor 44 is input to the control module 5. A combustion pressure sensor 30 is adapted to monitor in-cylinder pressure (COMB_PR). The combustion pressure sensor 30 is preferably non-intrusive and includes a force transducer having an annular cross-section that is adapted to be installed into the cylinder head at an opening for a glow-plug 28. The combustion pressure sensor 30 is installed in conjunction with the glow-plug 28, with combustion pressure mechanically transmitted through the glow-plug to the pressure sensor 30. The output signal, COMB_PR, of the pressure sensor 30 is proportional to cylinder pressure. The pressure sensor 30 includes a piezoceramic or other device adaptable as such. Other sensors preferably include a manifold pressure sensor for monitoring manifold pressure (MAP) and ambient barometric pressure (BARO), a mass air flow sensor for monitoring intake mass air flow (MAF) and intake air temperature (TIN), and a coolant sensor 35 monitoring engine coolant temperature (COOLANT). The system may include an exhaust gas sensor for monitoring states of one or more exhaust gas parameters, e.g., temperature, air/fuel ratio, and constituents. One skilled in the art understands that there may other sensors and methods for purposes of control and diagnostics. The operator input, in the form of the operator torque request, $T_{O\_REQ}$, is typically obtained through a throttle pedal and a brake pedal, among other devices. The engine is preferably equipped with other sensors for monitoring operation and for purposes of system control. Each of the sensors is signally connected to the control module 5 to provide signal information which is transformed by the control module to information representative of the respective monitored parameter. It is understood that this configuration is illustrative, not restrictive, including the various sensors being replaceable with functionally equivalent devices and routines.

The actuators are installed on the engine and controlled by the control module 5 in response to operator inputs to achieve various performance goals. Actuators include an electronically-controlled throttle valve which controls throttle opening in response to a control signal (ETC), and a plurality of fuel injectors 12 for directly injecting fuel into each of the combustion chambers in response to a control signal (INJ_PW), all of which are controlled in response to the operator torque request, $T_{O\_REQ}$. An exhaust gas recirculation valve 32 and cooler control flow of externally recirculated exhaust gas to the engine intake, in response to a control signal (EGR) from the control module. A glowplug 28 is installed in each of the combustion chambers and adapted for use with the combustion pressure sensor 30. Additionally, a charging system can be employed in some embodiments supplying boost air according to a desired manifold air pressure.

Fuel injector 12 is a high-pressure fuel injector adapted to directly inject a fuel charge into one of the combustion chambers in response to the command signal, INJ_PW, from the control module. Each of the fuel injectors 12 is supplied pressurized fuel from a fuel distribution system, and has operating characteristics including a minimum pulsewidth and an associated minimum controllable fuel flow rate, and a maximum fuel flow rate.

The engine may be equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. One exemplary system includes variable cam phasing, which is applicable to compression-ignition engines, spark-ignition engines, and homogeneous-charge compression ignition engines.

The control module 5 executes routines stored therein to control the aforementioned actuators to control engine operation, including throttle position, fuel injection mass and timing, EGR valve position to control flow of recirculated exhaust gases, glow-plug operation, and control of intake and/or exhaust valve timing, phasing, and lift on systems so equipped. The control module is configured to receive input signals from the operator (e.g., a throttle pedal position and a brake pedal position) to determine the operator torque request, $T_{O\_REQ}$, and from the sensors indicating the engine speed (RPM) and intake air temperature (Tin), and coolant temperature and other ambient conditions.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the indicated functionality. The control module has a set of control routines, including resident software program instructions and calibrations stored in memory and executed to provide the desired functions. The routines are preferably executed during preset loop cycles. Routines are executed, such as by a central processing unit, and are operable to monitor inputs from sensors and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, routines may be executed in response to occurrence of an event.

FIG. 1 depicts an exemplary diesel engine, however, the present disclosure can be utilized on other engine configurations, for example, including gasoline-fueled engines, ethanol or E85 fueled engines, or other similar known designs. The disclosure is not intended to be limited to the particular exemplary embodiments disclosed herein.

Figure 2:
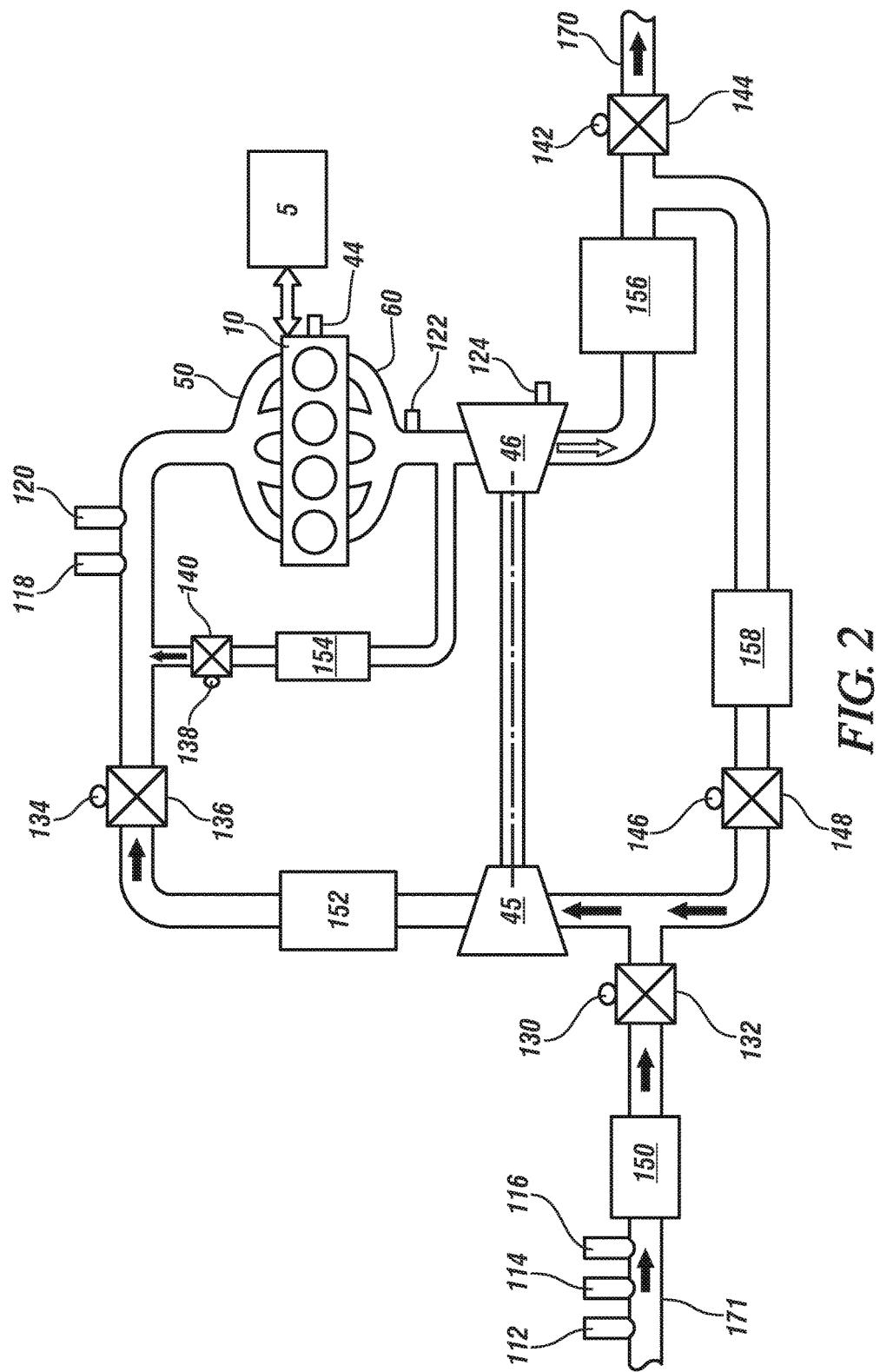
FIG. 2 schematically depicts an exemplary engine configuration including a turbocharger, and a multi-route exhaust gas recirculation system, in accordance with the present disclosure.

FIG. 2 schematically depicts an exemplary engine configuration including a turbocharger, and a multi-route exhaust gas recirculation system, in accordance with the present disclosure. The exemplary engine is multi-cylinder and includes a variety of fueling types and combustion strategies known in the art. Engine system components include an intake air filter 150, a throttle valve for lowpressure EGR 132, an intake air compressor including a turbine 46 and an air compressor 45, a charge air cooler 152, an intake air throttle valve 136, a high-pressure EGR valve 140 and cooler 154, an intake manifold 50, exhaust manifold 60, a diesel oxidation catalyst (DOC) and diesel particulate filter (DPF) 156, a throttle valve for low-pressure EGR 144, a low-pressure EGR cooler 158, and a low-pressure EGR valve 148. Ambient intake air is drawn into compressor 45 through intake 171. Pressurized intake air and EGR flow are delivered to intake manifold 50 for use in engine 10. Exhaust gas flow exits engine 10 through exhaust manifold 60, drives turbine 46, and exits through exhaust tube 170. The depicted EGR system includes a high pressure EGR system, delivering pressurized exhaust gas from exhaust manifold 60 to intake manifold 50. The depicted EGR system additionally includes, a low pressure EGR system, delivering low pressure exhaust gas from exhaust tube 170 to intake 171. Sensors are installed on the engine to monitor physical characteristics and generate signals which are correlatable to engine and ambient parameters. The sensors preferably include an ambient air pressure sensor 112, an ambient or intake air temperature sensor 114, and a mass air flow sensor 116 (all which can be configured individually or as a single integrated device), an intake manifold air temperature sensor 118, an MAP sensor 120, an exhaust gas temperature sensor 122, an air throttle valve position sensor 134 and a highpressure EGR valve position sensor 138, a turbine vane position sensor 124, as well as low-pressure EGR throttle valve position sensors 130 and 142, and a low-pressure EGR valve position sensor 146. Engine speed sensor 44 monitors rotational speed of the engine. Each of the sensors is signally connected to the control module 5 to provide signal information which is transformed by the control module 5 to information representative of the respective monitored parameter. It is understood that this configuration is illustrative, not restrictive, including the various sensors being replaceable within functionally equivalent devices and routines and still fall within the scope of the disclosure. Furthermore, the intake air compressor may include alternative turbocharger configurations within the scope of this disclosure.

The intake air compressor includes a turbocharger including an air compressor 45 positioned in the air intake of the engine which is driven by turbine 46 that is positioned in the exhaust gas flowstream. Turbine 46 can include a number of embodiments, including a device with fixed vane orientations or variable vane orientations. Further, a turbocharger can be used as a single device, or multiple turbochargers can be used to supply boost air to the same engine.

Variable geometry turbochargers (VGT) enable control of how much compression is performed on intake air. A control signal can modulate operation of the VGT, for example, by modulating an angle of the vanes in the compressor and/or turbine. Such exemplary modulation can decrease the angle of such vanes, decreasing compression of the intake air, or increase the angle of such vanes, increasing compression of the intake air. VGT systems allow a control module to select a level of boost pressure delivered to the engine. Other methods of controlling a variable charger output, for example, including a waste gate or a bypass valve, can be implemented similarly to a VGT system, and the disclosure is not intended to be limited to the particular exemplary embodiments disclosed herein for controlling boost pressure delivered to the engine.

Exemplary diesel engines are equipped with common rail fuel-injection systems, EGR systems, and VGT systems. Exhaust gas recirculation is used to controllably decrease combustion flaming temperature and reduce NOx emissions. VGT systems are utilized to modulate boost pressures to control a manifold air pressure and increase engine output. To accomplish engine control including control of the EGR and VGT systems, a multi-input multi-output air charging control module (MIMO module) can be utilized. A MIMO module enables computationally efficient and coordinated control of EGR and VGT based upon a single set of inputs describing desired engine operation. Such input, for example, can include an operating point for the engine describing an engine speed and an engine load. It will be appreciated that other parameters can be utilized as input, for example, including pressure measurements indicating an engine load.

Coupled MIMO control of both EGR and VGT, or control fixing response of both EGR and VGT based upon any given input, is computationally efficient and can enable complex control responses to changing inputs that might not be computationally possible in real-time based upon independent control of EGR and VGT. However, coupled control of EGR and VGT, including fixed responses of both parameters for any given input, requires simplified or best fit calibrations of the coupled controls in order to control both fixed responses. As a result, such calibrations can be challenging and can include less than optimal engine performance based upon the simplified control calibrations selected. EGR and VGT, for example, might optimally react differently to a rate of change in load or to engine temperatures. Additionally, control of EGR or VGT can reach limit conditions and result in actuator saturation. Coupled control resulting in actuator saturation can cause a condition known in the art as wind-up wherein expected behavior of the system and desired control of the system diverge and result in control errors even after the actuator saturation has been resolved. Additionally, control of EGR and VGT by a MIMO module is nonlinear, and defining the coupled functional relationships to provide the desired control outputs requires extensive calibration work.

VGT commands are one way to control boost pressure. However, other commands controlling a boost pressure such as a boost pressure command or a manifold air pressure command can be utilized similarly in place of VGT commands.

The engine configuration, such as the exemplary engine configuration, including a turbocharger, as is schematically depicted in FIG. 2 may be represented by a mathematical model. Model-based nonlinear control may be applied to transform desired air and charging targets to individual flow or power for each actuator, such as exhaust gas recirculation flow, intake air flow, and turbine power. An actuator position for each of the EGR valve, air throttle valve, and the VGT control can be uniquely determined based on the individual flow or power values, additionally resulting in a decoupled and nearly linearized system for feedback control. A method to control an engine including EGR, air throttle and air charging control includes utilizing physics model-based feedforward control, or feedback linearization control to decouple the controls of a multivariable system.

With a boosted engine configuration that includes multi-route EGR loops the system may operate running higher EGR rates at higher boost levels, however this affects the turbine and compressor flow and power which impacts boost control design and performance. By utilizing a physical model-based air charging control routine, the model-based controls can modulate air charging actuators to minimize the impact of varying high-pressure/low-pressure EGR rates on the boosting system. Based on a turbocharger energy balance model the desired boost may be maintained by adapting the VGT position to different combinations of HP and LP EGR for a given desired overall in-cylinder EGR rate. Unlike boost control methods that utilize lookup tables as feedforward control without taking into account the EGR operation and calibration, model based controls eliminate boost control recalibration against any changes of the mix between high-pressure and low-pressure EGR loops. This reduces couplings/interactions between the boost system and the multiple EGR loops. Model-based feedforward boost control additionally enhances robustness against system variations and environmental changes such as ambient temperature and pressure, reduces feedback control calibration, and improves transient responses via model-based feedforward control.

In accordance with the exemplary engine configuration depicted in FIG. 2, the various LP, HP, and combined EGR rates of the system air and EGR flows may be expressed by a series of relationships. The long-route EGR mixing point is the point where the LP EGR flow $W_{egr,LP}$ passes through LP EGR valve 148 and mixes with the fresh air flow $W_{air}$ as it passes through the LP EGR throttle valve 132. Low pressure EGR rate $r_{LP}$ at the long-route EGR mixing point may be expressed by the following relationship.

$$r_{LP} = \frac{W_{egr,LP}}{W_{air} + W_{egr,LP}} \quad [1]$$

The short-route EGR mixing point is the point where the HP EGR flow $W_{egr,HP}$ passes through HP EGR valve 140 and mixes with the compressor flow $W_c$ as it passes through the intake throttle valve 136. High pressure EGR rate $r_{LP}$ at the short-route EGR mixing point may be expressed by the following relationship.

$$r_{HP} = \frac{W_{egr,HP}}{W_c + W_{egr,HP}} \quad [2]$$

The in-cylinder EGR rate r in the cylinder charge flow $W_{cyl}$ may be expressed by the following relationships.

$$r = \frac{W_{egr,HP} + W_{egr,LP}}{W_{cyl}} \quad [3]$$

$$r = r_{HP} + (1 - r_{HP}) * r_{LP} \quad [4]$$

The split EGR ratio may then be expressed by the following relationship.

$$r_{SP} = \frac{W_{egr,LP}}{W_{egr,LP} + W_{egr,HP}} = 1 - \frac{r_{HP}}{r} \quad [5]$$

When the system is operating at steady-state, the system flows, including the cylinder charge flow $W_{cyl}$, the flow out of the turbine 46 $W_t$, and the flow into the compressor $W_c$, may be expressed by the following relationships:

$$W_{cyl} = \eta_v \frac{V_d}{120 R * T_i} P_i * N \quad [6]$$

wherein N is engine speed,
$V_d$ is engine displacement volume,
$P_i$ is the intake pressure,
R is the universal gas constant,
$\eta_v$ is the engine volumetric efficiency, and
$T_i$ is the intake temperature;

$$W_t = (1 - r_{HP}) * W_{cyl} + W_f \quad [7]$$

$$W_c = (r_{HP}) * W_{cyl} \quad [8]$$

Flow into the compressor $W_c$ may alternatively be expressed by the following relationship.

$$W_c = \frac{W_{air}}{(1 - r_{LP})}$$

At steady state the burned gas fractions at varying points in the system may also be expressed in relation to EGR rates. The burned gas fraction at the exhaust $F_x$, the burned gas fraction at the low pressure EGR mix point $F_{LP,mix}$, and the burned gas fraction at the intake $F_i$ may be represented by the following relationships in a dynamic state.

$$F_{egr,HP}(t) = F_x(t - \tau_{HP}) \quad [9]$$

$$m_i \dot{F}_i = W_{egr,HP} * (F_x(t - \tau_{Hp}) - F_i) + W_{itv} * (F_{itv} - F_i) \quad [10]$$

$$F_{egr,LP}(t) = F_x(t - \tau_{LP}) \quad [11]$$

$$m_{LP,mix} \dot{F}_{LP,mix} = W_{egr,LP} * (F_x(t - \tau_{LP}) - F_{LP,mix}) - W_{air} \cdot F_{LP,mix} \quad [12]$$

If the system is in steady-state, these relationships may alternatively be expressed by the following relationships.

$$F_{egr,HP} = F_x \quad [13]$$

$$F_{egr,LP} = F_x \quad [14]$$

$$F_x = \frac{1 + AFR_s}{1 + AFR} \quad [15]$$

$$F_{LP,mix} = r_{LP} * F_x \quad [16]$$

$$F_i = r_{HP} * F_x + (1 - r_{HP}) * F_{LP,mix} \quad [17]$$

$$F_i = r_{HP} * F_x + (1 - r_{HP}) * r_{LP} * F_x \quad [18]$$

The burned fraction at a particular point is generally related to oxygen concentrations, and the relationship between a burned fraction and an oxygen concentration at a particular point may be expressed by the following relationship.

$$O_2 \cong 0.23 * (1 - F) \quad [19]$$

An exemplary system model for the model based nonlinear control can be expressed as nonlinear differential equation in accordance with the following relationship.

$$\dot{y} = F(y) + Bu \quad [20]$$

The MIMO feedforward control applied to the inputs u in the exemplary system model expressed above can be expressed by the following relationship.

$$u = -B^{-1} F(y) + B^{-1} v \quad [21]$$

The term $-B^{-1}F(y)$ expresses the feedback linearization of the system if y is an actual measured or estimated parameter from the system, or it expresses the feedforward control of the system if y is replaced by its desired reference command to track. The feedback controller v can utilize proportional-integral-derivative (PID), linear quadratic regulator (LQR), or model predictive control (MPC) feedback control methods with minimum gains scheduling required. The multivariable system output vector $\dot{y}$ can be decoupled into a linear SISO feedback system, as is expressed by the following relationship.

$$\dot{y} = \begin{bmatrix} \dot{y}_1 \\ \dot{y}_2 \\ \vdots \\ \dot{y}_n \end{bmatrix} = \begin{bmatrix} v_1 \\ v_2 \\ \vdots \\ v_n \end{bmatrix} = v \quad [22]$$

The input vector u is input into the system model which applies model-based multivariable feedforward control to replace lookup tables, and additionally applies feedback control to improve tracking against unmodeled uncertainties. The output vector $\dot{y}$ is then decoupled into linear SISO feedback vector v.

An exemplary physics based air and charging system model of the exemplary engine configuration, including a turbocharger as is schematically depicted in FIG. 2 is expressed, in accordance with the basic system model relationships expressed above, by the following set of relationships.

$$\dot{p}_{rc} = -cP_c \left( p_{rc}, \frac{W_c \sqrt{T_{uc}}}{p_{uc}} \right) + J(\dot{W}_c, W_c) + cP_t \quad [23]$$

$$\begin{bmatrix} \frac{V_i}{RT_i} \dot{P}_i \\ m_i \dot{F}_i \\ m_c \dot{F}_c \end{bmatrix} = \begin{bmatrix} -W_{cyl} \\ 0 \\ 0 \end{bmatrix} + \begin{bmatrix} 1 & 1 & 0 \\ F_c - F_i & F_x - F_i & 0 \\ -F_c & 0 & F_x(t - \tau) \end{bmatrix} \begin{bmatrix} W_{itv} \\ W_{egr,HP} \\ W_{egr,LP} \end{bmatrix} \quad [24]$$

wherein $p_{rc}$ is the compressor pressure ratio,
$P_c$ is compressor power,
$P_t$ is turbine power,
$W_c$ is compressor flow,
$T_{uc}$ is temperature upstream of the compressor,
$p_{uc}$ is pressure upstream of the compressor,
$V_i$ is the intake volume,
R is the universal gas constant,
$T_i$ is the intake temperature,
$P_i$ is the intake pressure,
$m_i$ is the intake mass,
$m_c$ is the air mass before the compressor (at the low pressure EGR mix point),
$F_i$ is the burned gas fraction at the intake, $F_c$ is the burned gas fraction before the compressor (at the low pressure EGR fix point), $F_x$ is the burned gas fraction at the exhaust, t is time, and τ is a time delay.

The burned gas fraction before the compressor, $F_c$, may be expressed by the following relationship.

$$F_c = r_{LP} * F_x \quad [25]$$

The power balance expressed in relationship [23] is merely an exemplary power balance expression, and may alternatively be expressed by any of the following relationships.

$$\tau * \dot{P}_c = -P_c + \eta_m * P_t \quad [26]$$

$$\frac{1}{2} J_t \frac{d(N_t^2)}{dt} = P_t - P_c - P_{tf} \quad [27]$$

$$\frac{1}{2} J_t \frac{d(N_t^2)}{dt} = \eta_m P_t - P_c \quad [28]$$

wherein $N_t$ is the turbocharger shaft speed,

J is the turbocharger shaft inertia, $\eta_m$ is the mechanical efficiency at the turbocharger shaft, and $P_{tf}$ is the friction at the turbocharger shaft.

Flow through an EGR system can be modeled to estimate the flow based upon a number of known inputs. Flow through the EGR system can be modeled as flow through an orifice, wherein the orifice primarily includes an EGR valve or an orifice or venturi to a particular design. According to one exemplary embodiment, EGR flow, $W_{egr}$, can be modeled according to the following orifice flow relationship.

$$W_{egr} = A_{egr} \frac{P_x}{\sqrt{RT_{egr}}} \Psi(PR) \quad [29]$$

PR is a pressure ratio or ratio of intake pressure or pressure of charged air in the intake system at the outlet of the EGR system, $P_i$, to exhaust pressure or pressure in the exhaust system at the inlet of the EGR system upstream of the charging system, $P_x$. $T_{egr}$ can indicate a temperature of the exhaust gas or exhaust gas temperature at the inlet of the EGR system. According to one exemplary embodiment, $T_{egr}$ can be measured as an exit temperature of the EGR cooler. $A_{egr}$ is the effective flow area of the EGR system. R is the universal gas constant, known in the art. A critical pressure ratio, $PR_c$, can be expressed by the following relationship.

$$PR_c = \left(\frac{2}{\gamma+1}\right)^{\frac{\gamma}{\gamma-1}} \quad [30]$$

γ is a specific heat ratio, known in the art. If PR is greater than $PR_c$, then flow is subsonic. If PR is less than or equal to $PR_c$, then flow is choked. Ψ(PR) is a non-linear function and can be expressed by the following relationship.

$$\Psi(PR) = \begin{cases} \sqrt{\frac{2\gamma}{\gamma-1}(PR^{2/\gamma} - PR^{(\gamma+1)/\gamma})} & PR_c < PR < 1 \text{ (subsonic)} \\ \gamma^{1/2}\left(\frac{2}{\gamma+1}\right)^{\frac{\gamma+1}{2(\gamma-1)}} & PR \le PR_c \text{ (choked)} \end{cases} \quad [31]$$

$A_{egr}$ can be expressed as a function of EGR valve position, $x_{egr}$. However, based upon detailed modeling and experimental data, including a determination of heat loss through the walls of the system, a more accurate estimation for $A_{egr}$ can be expressed as a function of $x_{egr}$ and PR, which can be expressed by the following relationship.

$$A_{egr} = A_{egr}(x_{egr}, PR) \quad [32]$$

The method disclosed above assumes that the EGR system includes an outlet downstream of the charging system compressor and an inlet upstream of the charging system turbo unit or turbine. It will be appreciated that a different embodiment can be utilized with an EGR system including an outlet upstream of the charging system compressor and an inlet downstream of the charging system turbo unit or turbine or in the exhaust system of a vehicle utilizing a supercharger without a turbine. It will be appreciated that the above relationships and the associated inverse flow model can be modified for use with a number of exemplary EGR and charging system configurations, and the disclosure is not intended to be limited to the particular exemplary embodiments disclosed herein.

Figure 3:
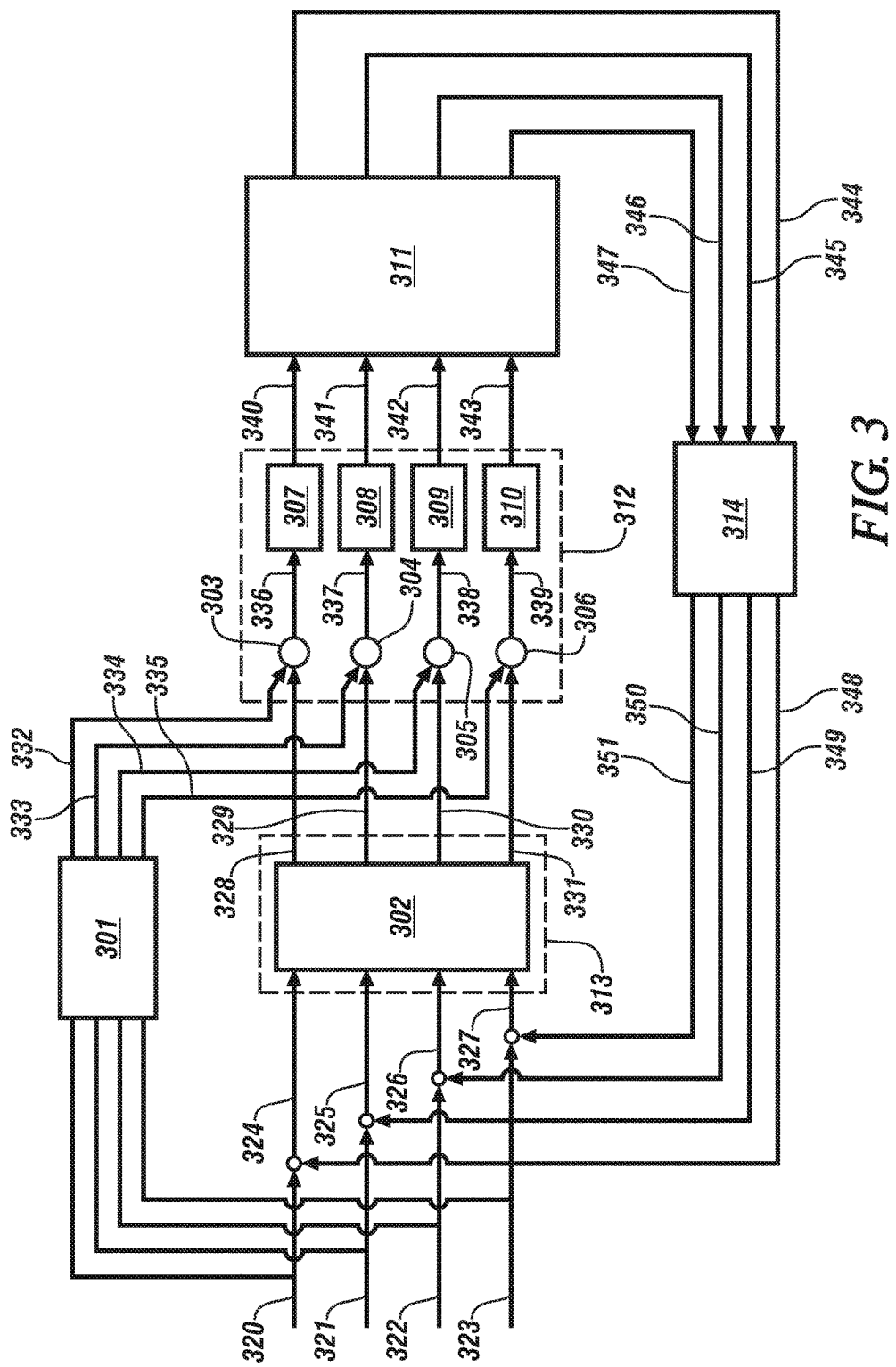
FIG. 3 schematically depicts an exemplary air charging multivariable control system, using model-based feedforward control and feedback control methods, in accordance with the present disclosure.

FIG. 3 schematically depicts an exemplary air charging multivariable control system, using model-based feedforward control and feedback control methods, in accordance with the present disclosure. Air charging system 311 receives commands and produces outputs. A number of modules and control strategies are depicted developing the commands, including the state variable observer module 314, the linear control strategy 313 including feedback control module 302, and the nonlinear control strategy 312. Desired operating parameter points or target operating points may include desired compressor pressure ratio $p_{rc\_des}$ 320, desired intake manifold pressure $p_{i\_des}$ 321, estimated burned gas fraction at the intake $F_i$ 322, and estimated burned gas fraction before the compressor, at the low pressure EGR fix point, $F_c$ 323. These desired/target points may alternatively be expressed in terms of EGR rates or oxygen concentrations at the desired mix point, as is described by the relationships described herein. The target points may, as exemplary, include any pair of the variables $r_{HP}$, $r_{LP}$, $r_S$, $F_i$, $F_c$, $O_{2,i}$, and $O_{2,c}$ as are described herein. These desired operating parameter points are compared with respective feedback signals 348, 349, 350 and 351 which are determined by either direct sensor measurements or the state variable observer module 314 based on the actual operating parameters of the air charging system 311. These operating parameters are represented by operating parameter signals 344, 345, 346 and 347, and may include, as exemplary, intake manifold pressure, intake manifold temperature, air mass, ambient pressure, and ambient temperature. The air charging system parameters may be monitored by sensors or alternatively estimated by the state variable observer module 314 if no sensor is present. The monitored and estimated system operating parameters may be used to determine feedback signals. The feedback signals describe actual compressor pressure ratio $p_{rc}$ 348, actual intake manifold pressure $p_i$ 349, actual burned gas fraction at the intake $F_i$ 350, and actual burned gas fraction before the compressor, measured at the low pressure EGR fix point $F_c$ 351. The comparison of the desired operating parameters and the respective actual operating parameters determines error terms for each parameter including a compressor pressure ratio error term 324, an intake manifold pressure error term 325, a burned gas fraction at the intake error term 326, and a burned gas fraction before the compressor error term 327. These error terms are then input into the feedback control module 302 of the linear control strategy 313. The feedback control method implemented by the feedback control module 302 determines feedback control signals $v_1$ 328, $v_2$ 329, $v_3$ 330 and $v_4$ 331. Desired operating parameter points, including desired compressor pressure ratio $p_{rc\_des}$ 320, desired intake manifold pressure $p_{i\_des}$ 321, estimated burned gas fraction at the intake $F_i$ 322, and estimated burned gas fraction before the compressor $F_c$ 323 are additionally input into feedforward control module 301, and feedforward signals including compressor pressure ratio feedforward signal 332, intake manifold pressure feedforward signal 333, burned gas fraction at the intake feedforward signal 334, and burned gas fraction before the compressor feedforward signal are output. Feedback control signals 328, 329, 330 and 331, as well as feedforward signals 332, 333, 334 and 335 are input into nonlinear control strategy 312. These signals are utilized in calculating turbine power transfer rate $R_t$ 336, air flow $W_{itv}$ 337, HP EGR flow $W_{egrHP}$ 338, and LP EGR flow $W_{egrLP}$ 339 at points 303, 304, 305 and 306. The calculations to determine these feedforward signals can be expressed by the following relationships:

$$R_t = \frac{1}{h_t}\left(P_c + \frac{v_1}{c}\right) \quad [33]$$

wherein $P_c$ is the compressor power, and
$h_t$ is the exhaust energy flow;

$$\begin{bmatrix} W_{itv} \\ W_{egr,HP} \end{bmatrix} = \begin{bmatrix} \frac{F_x - F_i}{F_x - F_c} & -\frac{1}{F_x - F_c} \\ \frac{F_i - F_c}{F_x - F_c} & \frac{1}{F_x - F_c} \end{bmatrix} \begin{bmatrix} W_{cyl} + v_2 \\ v_3 \end{bmatrix} \quad [34]$$

$$W_{egr,LP} = r_{LP} W_{itv} + \frac{1}{F_x} v_4 \quad [35]$$

Through the matrix multiplication of relationship [34], feedforward module 301, feedback control module 302 and nonlinear control strategy 312 also have access to information about the engine operation, and operating parameters of the air charging system 311, such as operating parameter signals 344, 345, 346 and 347 which may either be monitored by sensors or alternatively estimated by the state variable observer module 314. Signal 336, which may be either turbine power transfer rate $R_t$, or turbine power $P_t$ as the two are related by $P_t = h_t * R_t$, air flow $W_{itv}$ 337, HP EGR flow $W_{egrHP}$ 338, and LP EGR flow $W_{egrLP}$ 339 are then transformed into system control commands including a VGT command $u_{vgt}$ 340, an air throttle valve command $u_{itv}$ 341, a HP EGR valve command $u_{egr}$ 342, and a LP EGR valve command 343. The VGT command $u_{vgt}$ 340, air throttle valve command $u_{itv}$ 341, HP EGR valve command $u_{egr}$ 342, and LP EGR valve command 343 are then used to control the air charging system 311. The transformation of the turbine power transfer rate 336, air flow 337, HP EGR flow 338, and LP EGR flow 339 into the system control commands can be achieved through the use of an inverse flow model or an inverse of a physical model of a system.

An inverse flow model or an inverse of a physical model of a system can be useful in determining settings required to achieve a desired flow through an orifice in the system. Flow through a system can be modeled as a function of a pressure difference across the system and a flow restriction in the system. Known or determinable terms can be substituted and the functional relationship manipulated to make an inverse flow model of the system useful to determine a desired system setting to achieve a desired flow. Exemplary methods disclosed herein utilize a first input of an effective flow area or of a flow restriction for the system being modeled, and a second input including a pressure value for the system of pressure moving the flow through the system. One exemplary method of decoupled feed forward control of an EGR valve can include utilizing an inverse flow model of the system embodied in a mixed polynomial based upon the inverse model and calibrated terms. Another exemplary method of decoupled feed forward control of an EGR valve can include utilizing a dimensional table-based approach. Another exemplary method of decoupled feed forward control of an EGR valve can include utilizing an exponential polyfit model. An exemplary method of decoupled feed forward control of air throttle can utilize an inverse of the physical model of the system, a dimensional table approach, or an exponential polyfit model. An exemplary method of decoupled feed forward control of a charging system, such as a turbocharger equipped with a VGT, can utilize an inverse of the physical model of the system, a dimensional table approach, or an exponential polyfit model.

These methods can be utilized individually or in combination, and different methods can be utilized for the same system for different conditions and operating ranges. A control method can utilize an inverse flow model to determine a feed forward control command for a first selection including one of the EGR circuit, the air throttle system, and the charging system. The control method can additionally utilize a second inverse flow model to determine a second feed forward control command for a second selection including another of the EGR circuit, the air throttle system, and the charging system. The control method can additionally utilize a third inverse flow model to determine a third feed forward control command for a third selection including another of the EGR circuit, the air throttle system, and the charging system. In this way, a control method can control any or all of the EGR circuit, the air throttle system, and the charging system.

A method to control EGR flow by an inverse control method according to an inverse model of EGR flow is disclosed in co-pending and commonly assigned application Ser. No. 12/982,994, corresponding to publication US 2012-0173118 A1, which is incorporated herein by reference.

As indicated related to FIG. 3, feedback control module 302 of linear control strategy 313 determines feedback control signals 328, 329, 330 and 331 using feedback control methods. The exemplary feedback control methods used by the feedback control module of FIG. 3 can include PID control. In an exemplary embodiment, the PID control module can be designed as multiple individual modules, each assigned to a particular desired operating parameter input in order to output decoupled feedback control signals. The feedback control module may alternatively utilize model predictive control or linear quadratic regulator control methods.

Figure 4:
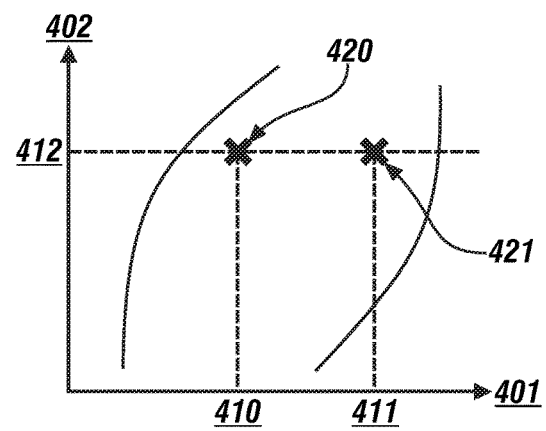
FIG. 4 graphically depicts a comparison of compressor operating points required to achieve the same pressure-ratio across the compressor with high-pressure EGR flow and low-pressure EGR flow, in accordance with the present disclosure.

FIG. 4 graphically depicts a comparison of compressor operating points required to achieve the same pressure-ratio across the compressor with high-pressure EGR flow and low-pressure EGR flow, in accordance with the present disclosure. This comparison illustrates a turbocharger operating point shift for varying HP EGR and LP EGR ratios. The x-axis 401 represents compressor flow $W_c$, the y-axis 402 represents the pressure ratio across the compressor $p_{rc}$. Horizontal line 412 represents a consistent pressure-ratio across the compressor, specifically, the pressure at the compressor outlet, $P_i$. Vertical line 410 represents the compressor flow necessary to achieve pressure-ratio 412 across the compressor with only HP EGR, as is represented by point 420. Vertical line 411 represents the compressor flow necessary to achieve pressure-ratio 412 across the compressor with only LP EGR, as is represented by point 421.

An overall in-cylinder EGR rate, r, could be achieved with different combinations of LP HGR and HP EGR. Overall in-cylinder EGR rate r can be expressed by the following relationship.

$$r = r_{HP} + (1 - r_{HP}) * r_{LP} \quad [36]$$

If only LP EGR is being utilized, compressor flow $W_c$ is equal to the flow into the cylinders at steady state $W_{cyl}$. If only HP EGR is being utilized, then compressor flow $W_c$ is reduced by the HP EGR flow and can be expressed by the following relationship.

$$W_c = (1 - r_{HP}) * W_{cyl} \quad [37]$$

Point 420 shows that to achieve a desired pressure-ratio across the compressor with only HP EGR being utilized, the compressor flow 410 may be expressed by the following relationship.

$$(1-r)*k*P_i \quad [38]$$

Point 421 shows that to achieve a desired pressure-ratio across the compressor with only LP EGR being utilized, the compressor flow 411 may be expressed by the following relationship.

$$k*P_i \quad [39]$$

In both of these relationships, k is a calculated term representing cylinder charge flow $W_{cyl}$ as is expressed in relationship [6] and may be expressed by the following relationship.

$$k = \eta_v \frac{V_d}{120 R * T_i} N \quad [40]$$

The turbocharger power shift is utilized due to how overall EGR is achieved to adapt the feedforward VGT command for a given desired boost pressure and LP/HP EGR rate. The turbocharger power shift may be expressed by the following relationship:

$$P_c = W_c T_a c_p \left[ \left( \frac{p_i}{p_a} \right)^\mu - 1 \right] / \eta_c \quad [41]$$

wherein μ is the specific heat ratio,
$c_p$ is specific heat under constant pressure, and
$\eta_c$ is compressor efficiency.

Figure 5:
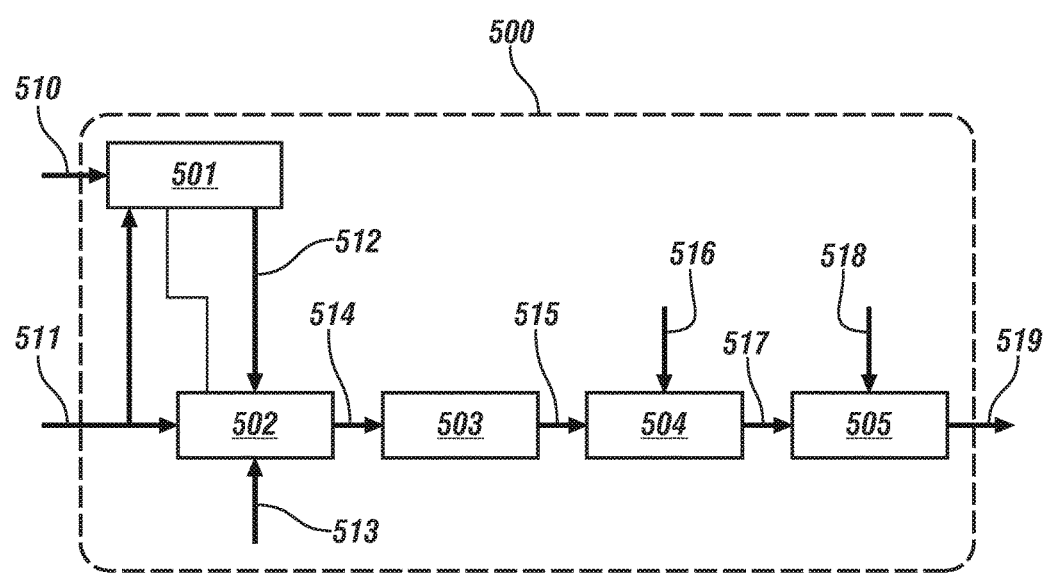
FIG. 5 schematically depicts an exemplary turbocharger feedforward control with high-pressure EGR flow and low-pressure EGR flow, in accordance with the present disclosure.

FIG. 5 schematically depicts an exemplary turbocharger feedforward control 500 with both high-pressure EGR flow and low-pressure EGR flow, in accordance with the present disclosure. Reference EGR rate r 510, and reference boost pressure $p_i$ 511 are input into compressor flow module 501 which determines compressor flow $W_c$ 512 based on target boost $p_i$ 511 and target/actual EGR rate r 510. The HP EGR rate $r_{HP}$ may be determined based on the relationship between in-cylinder EGR rate r, $r_{HP}$ and $r_{LP}$ expressed in relationship [28]. With both LP EGR and HP EGR operating, $r_{HP}$ and $r_{LP}$ may be used as targets over operating maps, or computed from measured or estimated burned gas fractions at mixing points ($F_i$, $F_{LP,mix}$) and burned exhaust gas fraction $F_x$. These values may come from sensors, or from a state observer estimator, and may be expressed by the following relationships.

$$r_{HP} = \frac{r - r_{LP}}{1 - r_{LP}} \quad [42]$$

$$r = F_i / F_x \quad [43]$$

$$r_{LP} = F_{LP,mix} / F_x \quad [44]$$

Compressor flow 512 may be determined by the following relationship.

$$W_c = (1 - r_{HP}) * k * p_i \quad [45]$$

Compressor flow 512 and reference boost pressure 511 are input into compressor power/flow relation module 502 which determines compressor power $P_c$ 514 based on compressor flow 512, reference boost pressure 511 and additional system inputs 513, which may include temperature upstream of the compressor $T_{uc}$, and pressure upstream of the compressor $p_{uc}$, which is determined based upon air flow $W_{air}$, low pressure throttle valve control $u_{ptv}$, ambient pressure $p_a$, and ambient temperature $T_a$. These compressor inlet conditions may be expressed by the following relationships based on the orifice relationship:

$$\Psi(p_{uc}/p_a) = W_{air} * \frac{\sqrt{RT_a}}{p_a} \bigg/ A_{lptv}(u_{lptv}) \quad [46]$$

wherein $A_{lptv}$ is the effective area of the low pressure throttle valve, and
$u_{lptv}$ is the low pressure throttle valve control.

$$T_{uc} = r_{LP} * T_{egr,LP} + (1 - r_{LP}) * T_a \quad [47]$$

Wherein $T_{egr,LP}$ is the temperature of the low pressure EGR, and Compressor power/flow relation module 502 determines compressor power 514 based on the relationship expressed by relationship [33] herein. Compressor power 514 is then input into the turbocharger power transfer module 503 which determines turbine power $P_T$ 515 based on the compressor power. The relationship between turbine flow and turbine power may be expressed by the following relationship:

$$P_t = c_p T_x W_t \eta_t \left[ 1 - \left[ \frac{p_s}{p_x} \right]^\mu \right] \quad [48]$$

wherein $\partial 2_t$ is the turbine efficiency,
$T_x$ is exhaust temperature,
$p_s$ is pressure at the downstream of turbine (turbine outlet pressure), and
$p_x$ is exhaust pressure.

The turbocharger power transfer dynamics may be represented by the following relationships:

$$\tau * \dot{P}_c = -P_c + \eta_m * P_t \quad [49]$$

$$(\tau * s + 1)P_c = \eta_m \quad [50]$$

wherein s is the differential operator from differentiation in Laplace domain. Based on the turbine flow-power relationship, the compressor flow-power relationship and the turbocharger power transfer dynamics, the turbocharger power balance may be expressed by the following relationship:

$$\frac{T_{uc}}{T_x} * \frac{(\tau s + 1)}{\eta_m \eta_t \eta_c} * \frac{\left[\frac{p_i}{p_{uc}}\right]^\mu - 1}{1 - \left[\frac{p_s}{p_x}\right]^\mu} = \frac{W_t}{W_c} \cong \frac{W_c^d + W_f^d}{W_c} \quad [51]$$

wherein delayed MAF flow $W^d_c$, and delayed fuel flow $W^d_f$ are used to replace the current turbine flow.

Turbine power 515 is input into turbine power/flow relation module 504, as are additional system inputs 516 which may include pressure at the turbine input $p_{t,in}$, temperature at the turbine input $T_{t,in}$ and pressure at the turbine output $p_{t,out}$. Turbine power/flow relation module 504 outputs a turbine flow $W_t$ 517 based on these inputs. Turbine flow 517 is then input into the VGT flow equation module 505 which may use an inverse system model to transform turbine flow 517 into a VGT control command $u_{vgt}$ 519. The VGT inversion model includes determining a desired flow through the turbine using manifold flow/enthalpy balance as follows:

$$W_t = (\bar{P}_b \bar{r}_{HP}, r_{Hp}) + FBK(P_i - \bar{P}_i) \quad [52]$$

wherein FF is the feedfoward term,
FBK is the feedback term,
$\bar{P}_1$ is a target intake pressure, and
$\bar{r}_{HP}$ is a target high pressure EGR rate.

Target exhaust (turbine inlet) pressure is found from desired boost and compressor flow using the turbocharger power balance.

$$\frac{1}{\eta_m \eta_t \eta_c} * \frac{1}{T_{t,in}} * \frac{\bar{W}_c * T_{c,in} * \left[\left(\frac{\bar{P}_{boost}}{P_{c,in}}\right) - 1\right]}{(\bar{W}_c + \bar{W}_f)} = 1 - \left(\frac{P_{t,out}}{\bar{P}_{t,in}}\right)^\mu \quad [53]$$

Wherein a term x1 is equivalent to $$\frac{1}{T_{t,in}} * \bar{W}_c * T_{c,in} * \left[\left(\frac{\bar{P}_{boost}}{P_{c,in}}\right) - 1\right],$$

and a term x2 is equivalent to the sum of target compressor flow and target fuel flow. When terms x1 and x2 are input into a regression which fits data based on x1 and x2 a value y is determined Target exhaust pressure may then be calculated based on the inversion $(1-y)^{-1/\mu}$. The VGT position required for desired flow through turbine at the target turbine inlet pressure may then be found using the following VGT flow relationships.

$$W_t = A(u_{vgt}) * \frac{\bar{P}_{t,in}}{\sqrt{RT_{t,in}}} \Psi\left(\frac{\bar{P}_{t,in}}{P_{t,out}}\right) \quad [54]$$

-continued $$A(u_{vgt}) = \frac{W_t}{\Psi\left(\frac{\bar{P}_{t,in}}{P_{t,out}}\right)} * \frac{\sqrt{RT_{t,in}}}{P_{t,out}} * \frac{P_{t,out}}{\bar{P}_{t,in}} \quad [55]$$

A term z1 is equivalent to $$\frac{W_t}{\Psi\left(\frac{\bar{P}_{t,in}}{P_{t,out}}\right)} * \frac{\sqrt{RT_{t,in}}}{P_{t,out}},$$

and a term z2 is equivalent to $$\frac{P_{t,out}}{\bar{P}_{t,in}}.$$

When terms z1 and z2 are input into a regression which fits data based on z1 and z2 a feedforward VGT position command $u_{vgt}$ is determined. This command is then used to control the VGT of the air charging system to achieve a target boost pressure.

Figure 6:
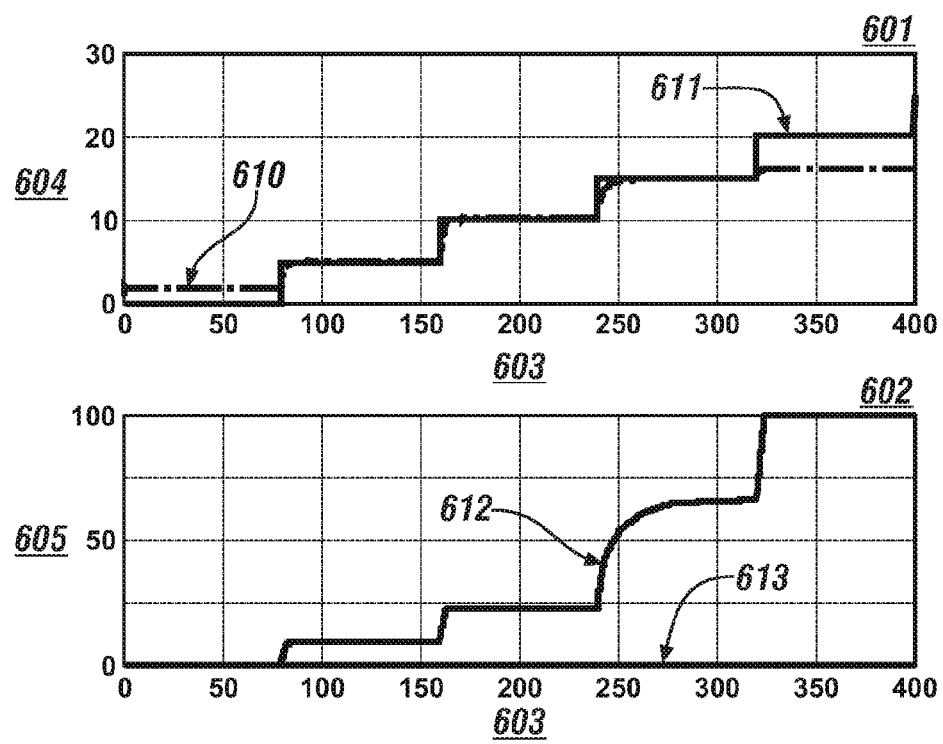
FIG. 6 graphically depicts an exemplary EGR control scheme, including a comparison of a measured EGR rate and a desired EGR rate to an EGR actuator opening percentage, in accordance with the present disclosure.

FIG. 6 graphically depicts an exemplary EGR control scheme, including a comparison of a measured EGR rate and a desired EGR rate to an EGR actuator opening percentage, in accordance with the present disclosure. EGR rate is controlled using only the LP EGR loop. Plot 601 depicts EGR rate 604 as a function of time 603. Measured EGR rate is depicted as line 610. Desired rate is depicted as line 611. Plot 602 depicts EGR actuator opening percentage 605 as a function of time 603. As the EGR rate is being controlled using only the LP EGR loop, LP EGR actuator opening position 612 is controlled to increase opening percentage 605 stepwise as a function of time. HP EGR actuator opening position 613 remains unopened at 0% throughout.

Figure 7:
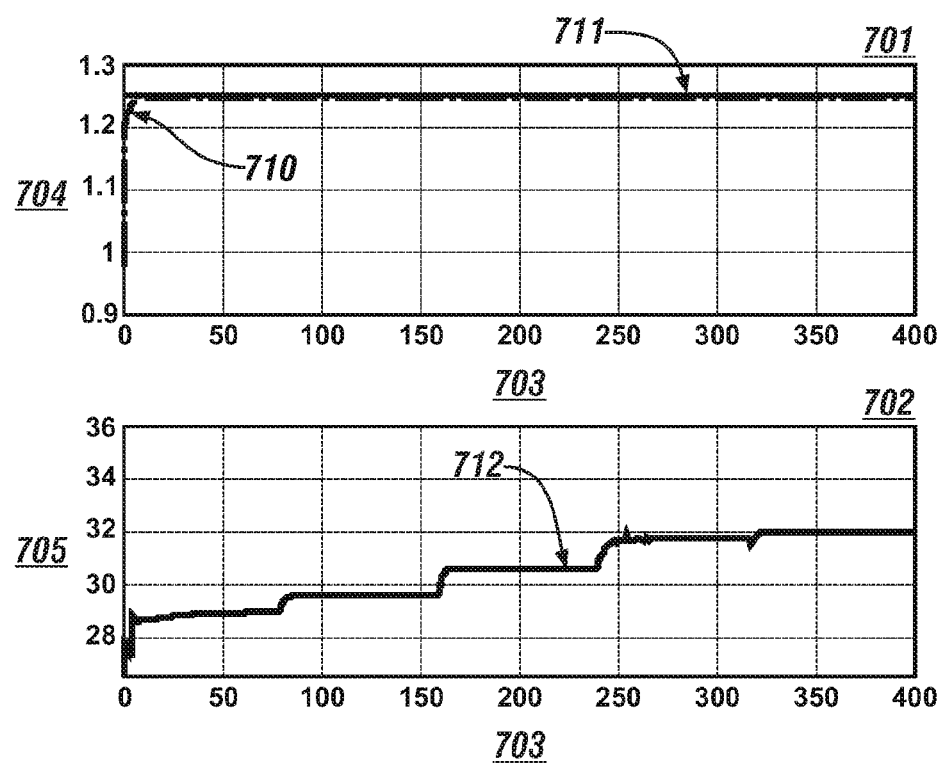
FIG. 7 graphically depicts an exemplary boost control scheme, wherein both high-pressure EGR and low-pressure EGR flows are considered, including a comparison of a measured intake manifold pressure and a desired intake manifold pressure to a VGT actuator opening percentage, in accordance with the present disclosure.

FIG. 7 graphically depicts an exemplary boost control scheme, wherein both high-pressure EGR and low-pressure EGR flows are considered, including a comparison of a measured intake manifold pressure and a desired intake manifold pressure to a VGT actuator opening percentage, in accordance with the present disclosure. VGT feedforward control is model based, and incorporates how EGR is delivered, considering both LP EGR rate and HP EGR rates. Plot 701 depicts pressure 704 as a function of time 703. Desired intake manifold pressure $p_i$ is constant and is depicted by line 711. Plot 702 depicts VGT actuator open percentage 705 as a function of time 703. VGT actuator opening position 712 is shown. Measured intake manifold pressure 710 is shown achieving and tracking the desired target boost (intake manifold pressure $p_i$) 711 as VGT actuator opening position 712 is modulated automatically using the feedforward control methods in accordance with the present disclosure.

Figure 8:
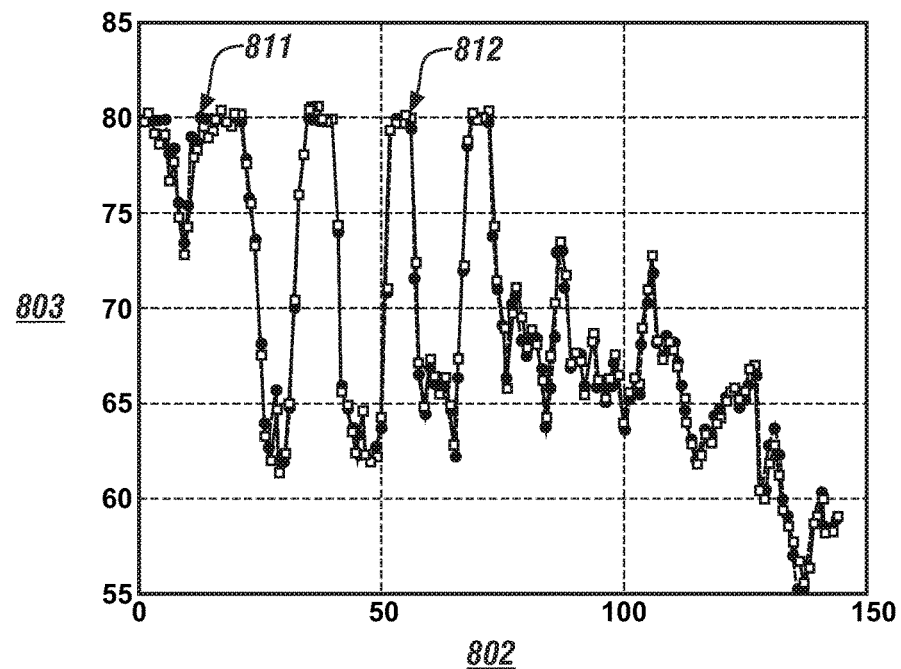
FIG. 8 graphically depicts exemplary data comparing actual VGT flow and estimated VGT flow, in accordance with the present disclosure.

FIG. 8 graphically depicts exemplary data comparing actual VGT flow 811 and estimated VGT flow 812, in accordance with the feedforward VGT model of the present disclosure. Over sample size 802 the VGT flow fit 803 between actual VGT flow 811 and estimated VGT flow 812 tracks closely.

Figure 9:
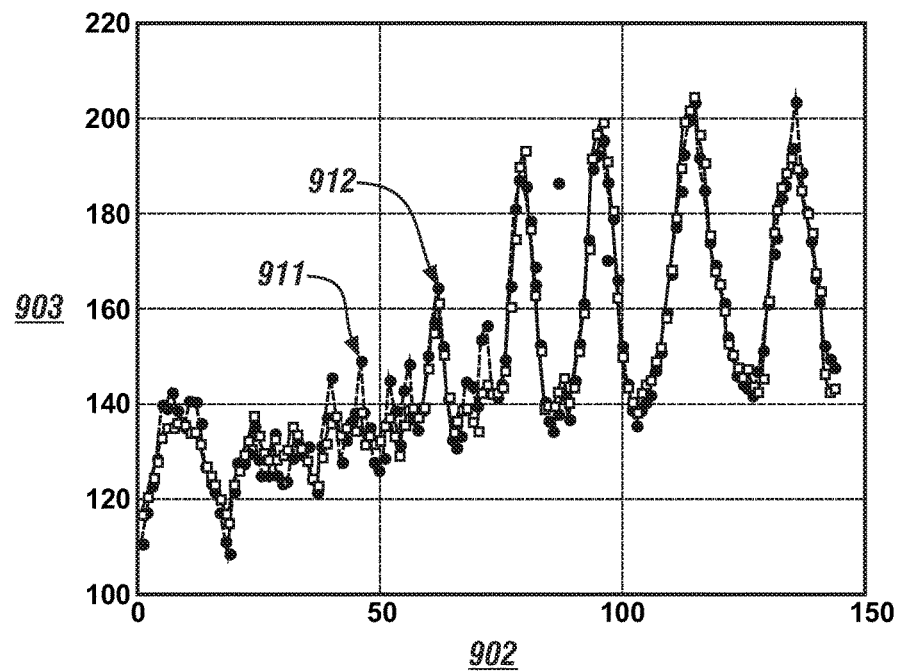
FIG. 9 graphically depicts exemplary data comparing computed target turbine inlet pressure and measured target turbine inlet pressure, in accordance with the present disclosure.

FIG. 9 graphically depicts exemplary data comparing computed target turbine inlet pressure 912 and measured target turbine inlet pressure 911, in accordance with the feedforward VGT model of the present disclosure. Over sample size 902 the VGT flow fit 903 between actual computed target turbine inlet pressure 912 and measured target turbine inlet pressure 911 tracks closely.

Figure 10:
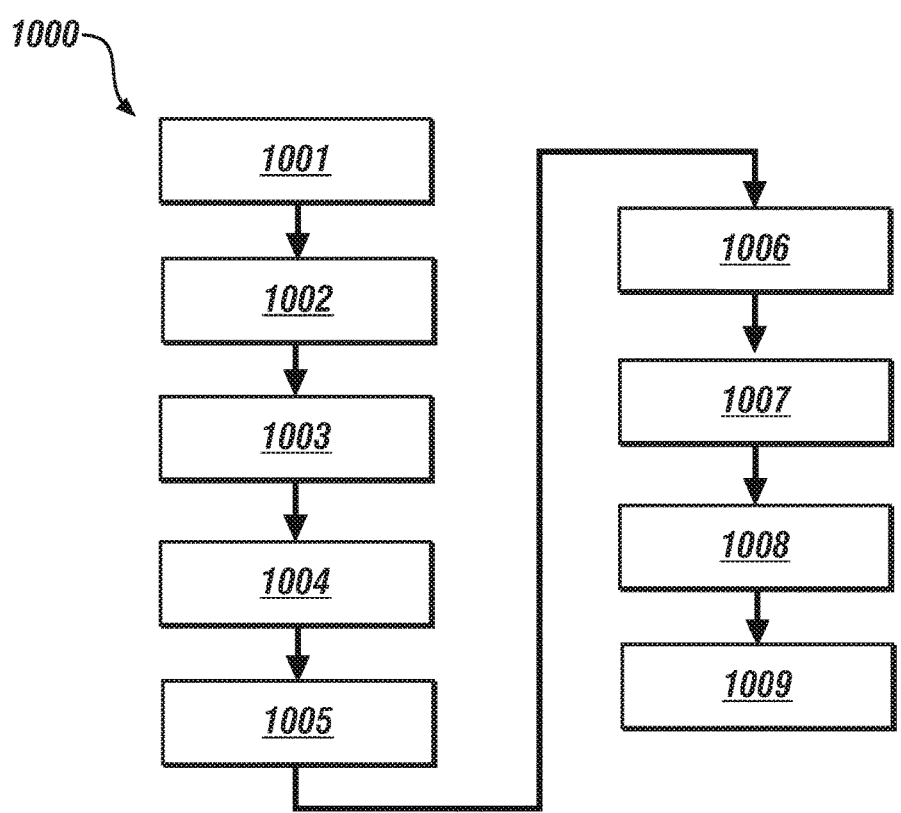
FIG. 10 depicts an exemplary process, in accordance with the present disclosure.

FIG. 10 depicts an exemplary process of model-based feedforward turbocharger control 1000 of an internal combustion engine including an EGR system with a high-pressure EGR loop and a low-pressure EGR loop, in accordance with the present disclosure. Table 1 is provided as a key wherein the numerically labeled blocks and the corresponding functions are set forth as follows.

TABLE 1

| BLOCK | BLOCK CONTENTS |
|---|---|
| 1001 | Monitor a target EGR rate and a target intake manifold pressure |
| 1002 | Monitor an actual EGR rate |
| 1003 | Determine a compressor flow based on the target EGR rate, the target intake manifold pressure and the actual EGR rate |
| 1004 | Monitor operating conditions of a compressor in the air charging system and operating conditions of a turbine in the air charging system |
| 1005 | Determine power requested by the compressor in the air charging system based on the compressor flow, the target intake manifold pressure, and the monitored operating conditions of the compressor |
| 1006 | Determine power to be generated by the turbine based upon the power requested by the compressor |
| 1007 | Determine a turbine flow based upon the power to be generated by the turbine, and the monitored operating conditions of the turbine |
| 1008 | Determine a system control command for the air charging system based on the turbine flow and the monitored operating conditions of the turbine |
| 1009 | Control the air charging system based on the system control command |

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method of model-based control of an air charging system in an internal combustion engine including an exhaust gas recirculation system with a high pressure exhaust gas recirculation loop and a low pressure exhaust gas recirculation loop, the method comprising:
monitoring an actual exhaust gas recirculation rate;
monitoring operating conditions of a compressor in the air charging system and operating conditions of a turbine in the air charging system;
determining a compressor flow based on a target exhaust gas recirculation rate, a target intake manifold pressure and the actual exhaust gas recirculation rate;
determining a power requested by the compressor in the air charging system based on the compressor flow, the target intake manifold pressure, and the monitored operating conditions of the compressor;
determining a power to be generated by the turbine based upon the power requested by the compressor;
determining a turbine flow based upon the power to be generated by the turbine and the monitored operating conditions of the turbine;
determining a system control command for the air charging system based on the turbine flow and the monitored operating conditions of the turbine; and
controlling the air charging system based on the system control command.

2. The method of claim 1, wherein the air charging system comprises a variable geometry turbocharger, including the turbine and the compressor.

3. The method of claim 1, wherein monitoring the actual exhaust gas recirculation rate comprises monitoring an overall in-cylinder exhaust gas recirculation rate incorporating a rate of high pressure exhaust gas recirculation and the rate of low pressure exhaust gas recirculation.

4. The method of claim 3, further comprising controlling the overall in-cylinder exhaust gas recirculation rate using only low pressure exhaust gas recirculation system control valves.

5. The method of claim 4, wherein the overall in-cylinder exhaust gas recirculation rate is expressed by the following relationship, $$r = r_{HP} + (1 - r_{HP}) * r_{LP}$$

wherein r is the overall in-cylinder exhaust gas recirculation rate,
$r_{HP}$ is the high pressure exhaust gas recirculation rate,
$r_{LP}$ is the low pressure exhaust gas recirculation rate.

6. The method of claim 1, wherein the compressor flow is determined in accordance with the following relationship:

$$W_c = (1 - r_{HP}) * \eta_v \frac{V_d}{120 R * T_i} N * p_i$$

wherein $W_c$ is a compressor flow,
$r_{HP}$ is a high pressure exhaust gas recirculation rate,
$\eta_v$ is a volumetric efficiency,
R is a universal gas constant,
$T_i$ is a intake temperature,
$V_d$ is a volumetric displacement,
N is a engine speed, and
$p_i$ is a intake manifold pressure.

7. The method of claim 1, wherein determining the system control command for the air charging system comprises:
determining a target turbine inlet pressure based on a desired intake manifold pressure and the compressor flow; and
determining the system control command required to achieve the turbine flow at the target turbine inlet pressure.

8. The method of claim 1, wherein determining the power requested by the compressor in the air charging system based on the compressor flow, the target intake manifold pressure, and the monitored operating conditions of the compressor comprises utilizing the following relationship, $$P_c = W_c T_{uc} c_p \left[ \left( \frac{p_i}{p_{uc}} \right)^\mu - 1 \right] / \eta_c$$

wherein $P_c$ is a power requested by the compressor,
$W_c$ is a compressor flow,
$T_{uc}$ is a temperature upstream of the compressor,
$c_p$ is a specific heat under constant pressure,
$p_i$ is an intake pressure,
$p_{uc}$ is a pressure upstream of the compressor
$\mu$ is a specific heat ratio, and
$\eta_c$ is an efficiency of the compressor.

9. The method of claim 1, wherein determining a turbine flow based upon the power to be generated by the turbine and the monitored operating conditions of the turbine comprises utilizing the following relationship, $$P_t = c_p T_x W_t \eta_t \left[1 - \left[\frac{p_s}{p_x}\right]^\mu\right]$$

wherein $P_t$ is a power to be generated by the turbine,
$\eta_t$ is a turbine efficiency,
$T_x$ is an exhaust temperature,
$p_s$ is a turbine outlet pressure, and
$p_x$ is an exhaust pressure.

* * * * *